April 12, 1966 G. B. ENTZ 3,245,129
SYSTEM FOR MANUFACTURING PRE-CAST BUILDING STONE
Filed Sept. 25, 1961 8 Sheets-Sheet 1

INVENTOR.
GERHARD B. ENTZ
BY
ATTORNEYS

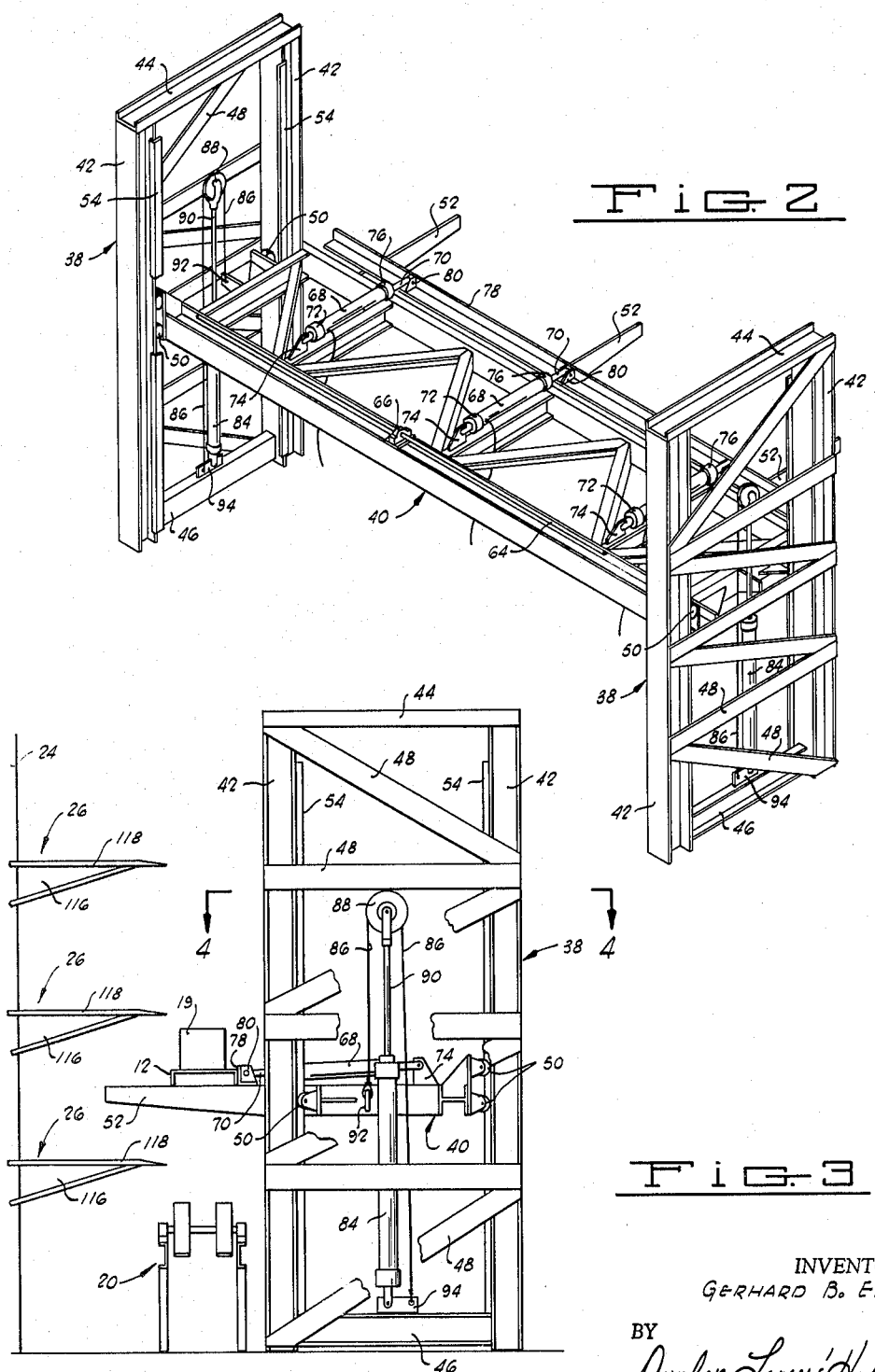

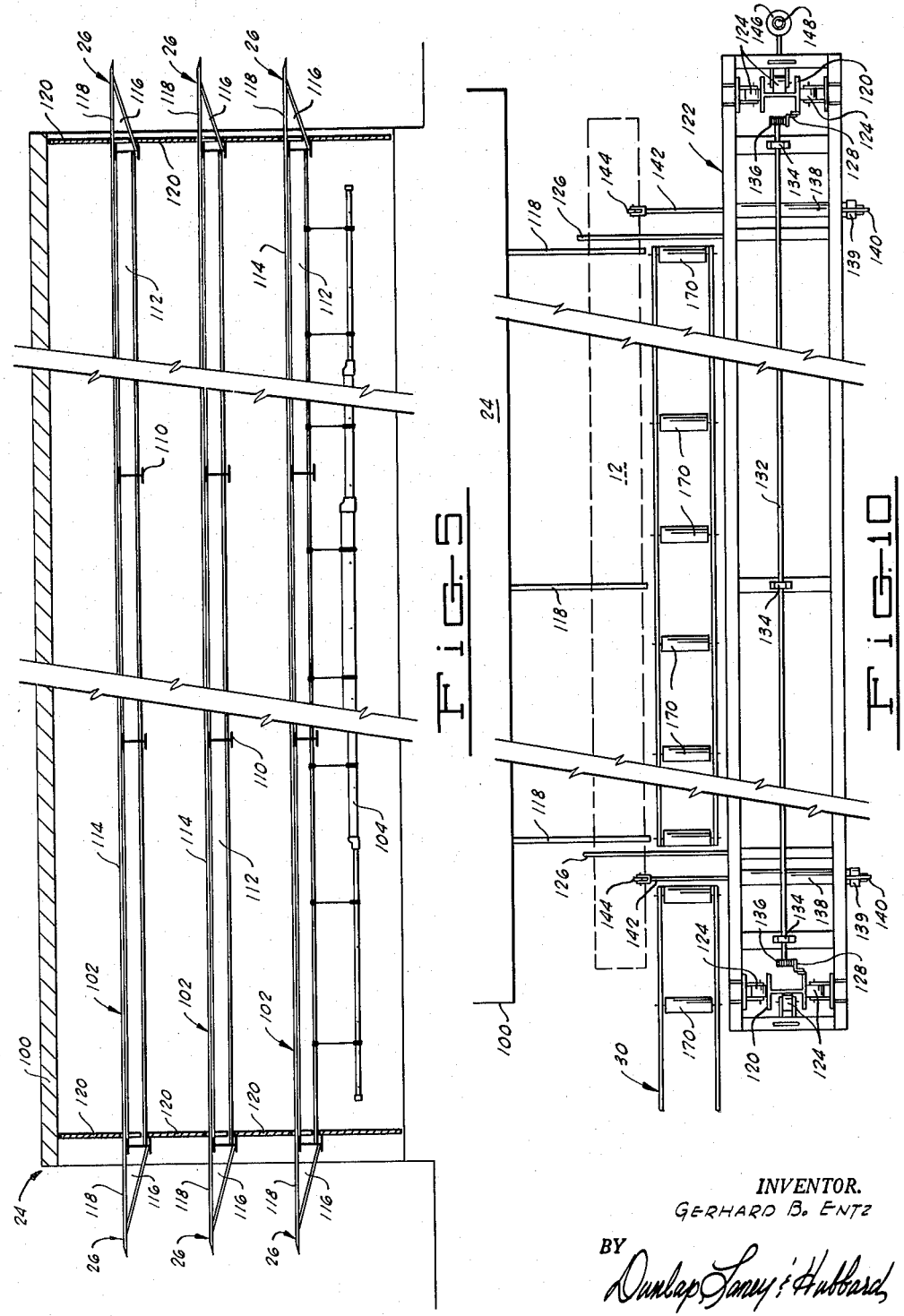

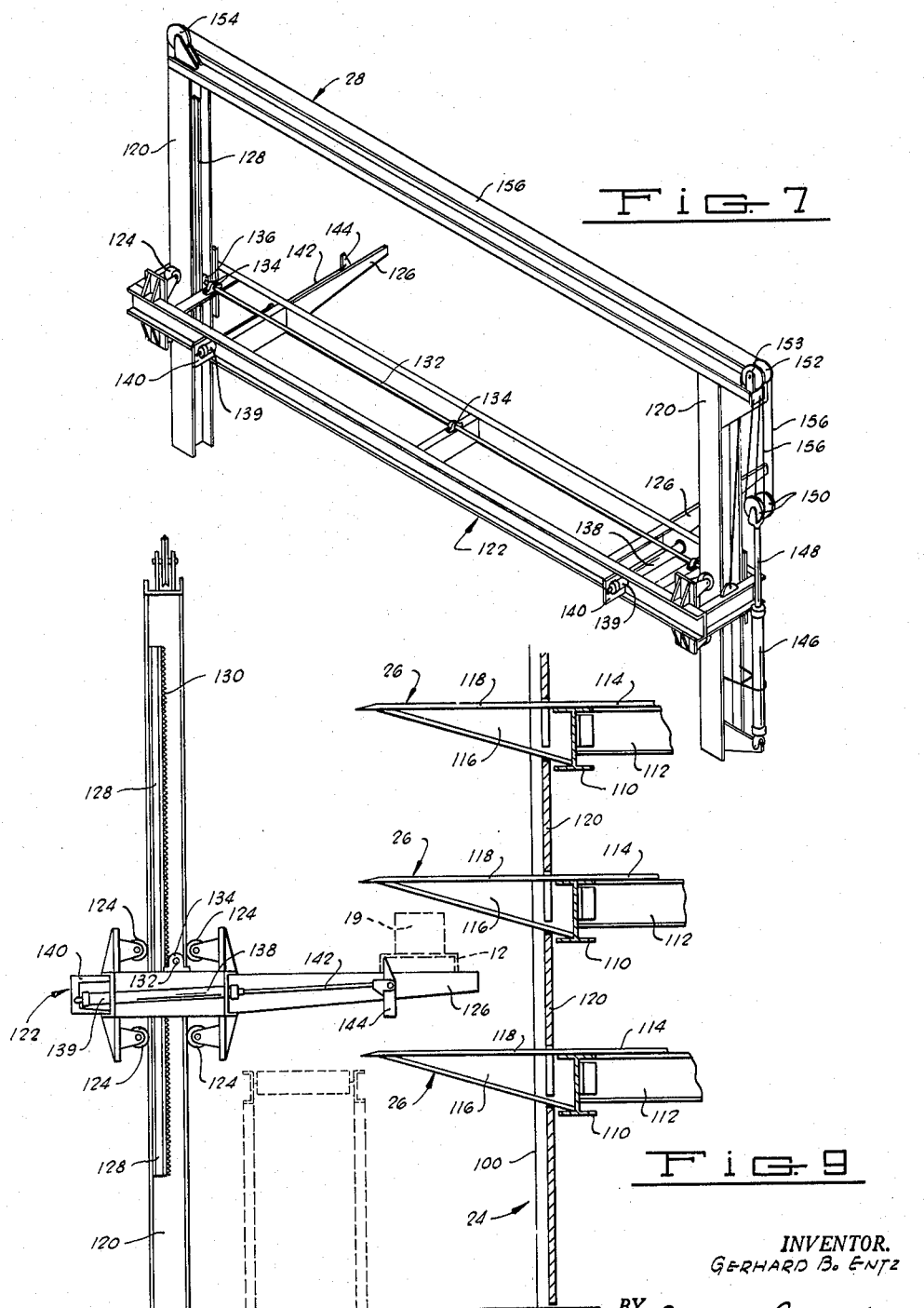

April 12, 1966 G. B. ENTZ 3,245,129
SYSTEM FOR MANUFACTURING PRE-CAST BUILDING STONE
Filed Sept. 25, 1961 8 Sheets-Sheet 6

INVENTOR.
GERHARD B. ENTZ
BY
Dunlap, Laney & Hubbard
ATTORNEYS

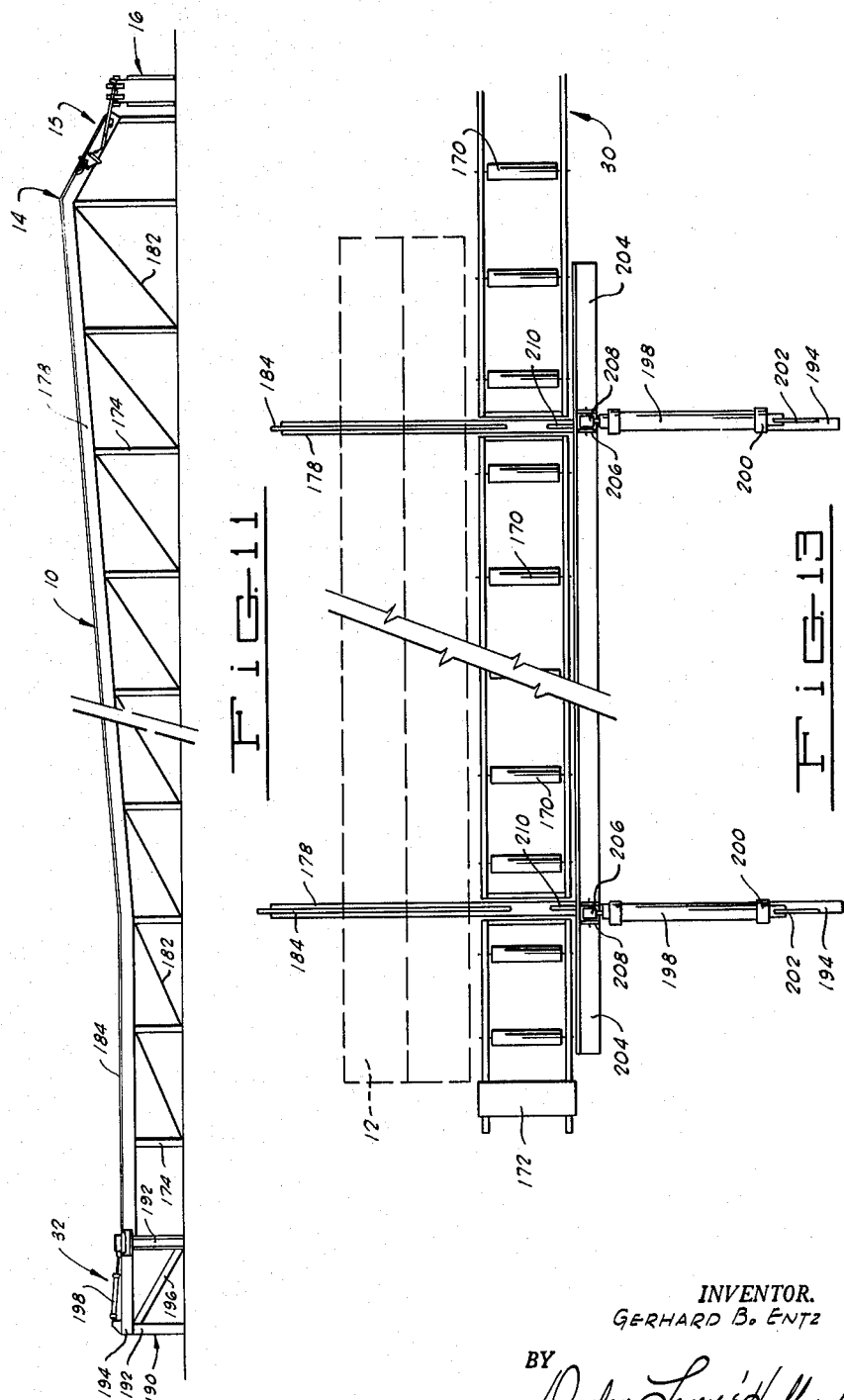

INVENTOR.
GERHARD B. ENTZ

United States Patent Office 3,245,129
Patented Apr. 12, 1966

3,245,129
SYSTEM FOR MANUFACTURING PRE-CAST
BUILDING STONE
Gerhard B. Entz, 2805 Newlands St., Belmont, Calif.
Filed Sept. 25, 1961, Ser. No. 140,502
21 Claims. (Cl. 25—2)

This invention relates to a system for manufacturing pre-cast building stones. More particularly, but not by way of limitation, the invention relates to a method of molding and curing pre-cast building stone, and to improvements in the arrangement and cooperation of the apparatus employed for lifting and transporting the stone, and in the kiln used for curing the stone. In one of its more specific aspects, the invention relates to apparatus for loading and unloading a kiln used in curing such pre-cast stone.

As it is well known in the art, a wide variety of pre-cast building stones are manufactured today. One of the most popular types of pre-cast stone is manufactured by a process in which sand and rock aggregate materials are first mixed in suitable proportion and then the mixture is molded in place upon a supporting structure called a pallet. The pallet is usually an elongated member having a flat, horizontal upper surface upon which the molded stone stands before, during, and after curing. Since, in this process, no supporting mold structure is continuously employed to assure that the uncured stone will retain its desired shape, the pallets supporting the molded sand and aggregate mixture must be handled fairly gently to prevent portions of the molded mixture from crumbling or falling away.

The method which has heretofore been employed to place the uncured stones in a kiln for curing has been to use a mobile fork lift apparatus to engage and lift the pallets supporting the stone. The fork lift vehicle is driven into the kiln and the pallets are unloaded upon racks in the kiln. After the stones have been cured, the kiln is again opened, the fork lift driven in, and the pallets loaded on the fork lift and removed. There has been widespread dissatisfaction with this method of loading stone-supporting pallets into the kiln for curing, since the sudden jolts and vibration which are inherent in the operation of such fork lift vehicles cause a considerable portion of the stones to crumble or lose their molded shaped. Also, the length of stone which could be produced by such method has been necessarily limited. Moreover, the kilns must be of very large size in order to allow the fork lift vehicles to be driven in and out.

The present invention comprises a novel system for producing pre-cast building stone, which system is compact and requires a minimum number of operating personnel. Perhaps more important, the apparatus of the system handles the pallets supporting uncured stone very gently in loading them into the kiln so that very few of the stones are ruined by crumbling or cracking. The arrangement and cooperation of the several components of the system is such that the elongated, channel-shaped pallets are automatically cycled through the molding apparatus and the kiln and are then returned to the molding apparatus without the intervention of any operating personnel and without the use of fork lifts or analogous equipment. The novel kiln and the apparatus used in loading and unloading it cooperate in a novel manner to allow the process to be operated substantially continuously, if desired.

In its broadest aspect, the system of the present invention comprises a molding device with trackways on each side of it for delivering elongated, channel-shaped pallets to it, and for receiving such pallets from the molding device after the stone has been molded thereon; a novel pallet loading machine for gently lifting the pallets from the trackway and placing them in the kiln; a compact, highly efficient kiln especially adapted to receive pallets from the loading machine; a novel kiln unloading device for removing the pallets from the kiln and placing them upon a conveyor; a device for moving the pallets off the conveyor and onto a pallet storage rack; and a mechanism for transferring empty pallets from the storage rack onto the trackway leading to the molding device. Within the broad combination of the system as a whole, the invention is also characterized by certain sub-combinations which function in a novel and highly useful manner, and which will be more fully appreciated as the detailed description of the system is developed hereinafter.

From the foregoing discussion it will be appreciated that one of the major objects of this invention is to provide an improved system for producing pre-cast building stone, which system involves relatively little waste of materials resulting from crumbling, cracking or distortion of molded stones prior to curing.

An additional object of the present invention is to provide a compact, efficient, semi-automatic system for producing pre-cast building stone.

Another object of this invention is to improve the process of manufacturing pre-cast building stone so that the pallets utilized in such a process for supporting the stone can be circulated through the system semi-automatically and without intervention by operating personnel.

A further object of this invention is to provide a kiln for curing pre-cast building stone, which kiln is relatively compact and yet has a substantially greater capacity than previous types of kilns.

Another object of this invention is to provide rapid loading and unloading kiln appartus for curing pre-cast building stone, which kiln apparatus does not jolt or vibrate the stone so as to cause cracking or crumbling thereof.

Yet another object of the invention is to provide pre-cast building stone manufacturing apparatus which is relatively inexpensive, yet which is structurally sturdy and characterized by a long and trouble-free operating life.

In the drawings:
FIGURE 1 is a partially schematic plan view of the novel system for manufacturing pre-cast stone.
FIGURE 2 is a perspective view of the kiln loading device utilized for loading pallets carrying uncured stone into a curing kiln.
FIGURE 3 is an end view of the kiln loading device shown in FIG. 2.
FIGURE 4 is a view in section taken along line 4—4 of FIG. 3. Parts of the loading device have been broken away to facilitate enlargement of the figure.
FIGURE 5 is a view in section taken along line 5—5 of FIG. 1.
FIGURE 6 is a view in section taken along line 6—6 of FIG. 1.
FIGURE 7 is a perspective view of the kiln unloading device utilized to remove pallets carrying cured stone from the kiln.
FIGURE 8 is a view in elevation of the kiln unloading device shown in FIG. 7 as the device appears when the viewer faces toward the kiln.
FIGURE 9 is a view in section taken along line 9—9 of FIG. 8. The pallet conveyor and a portion of the kiln are also illustrated in section to show the relationship of the kiln unloader to the kiln and the pallet conveyor.
FIGURE 10 is a view in section taken substantially along line 10—10 of FIG. 8. Portions of the kiln unloading device have been broken away to facilitate enlargement of the figure.
FIGURE 11 is a view in elevation of the pallet storage rack and of the apparatus which is utilized for transferring pallets onto and off of the pallet storage rack.

FIGURE 13 is a plan view of the pallet transferring device shown in FIG. 12.

Figure 1:
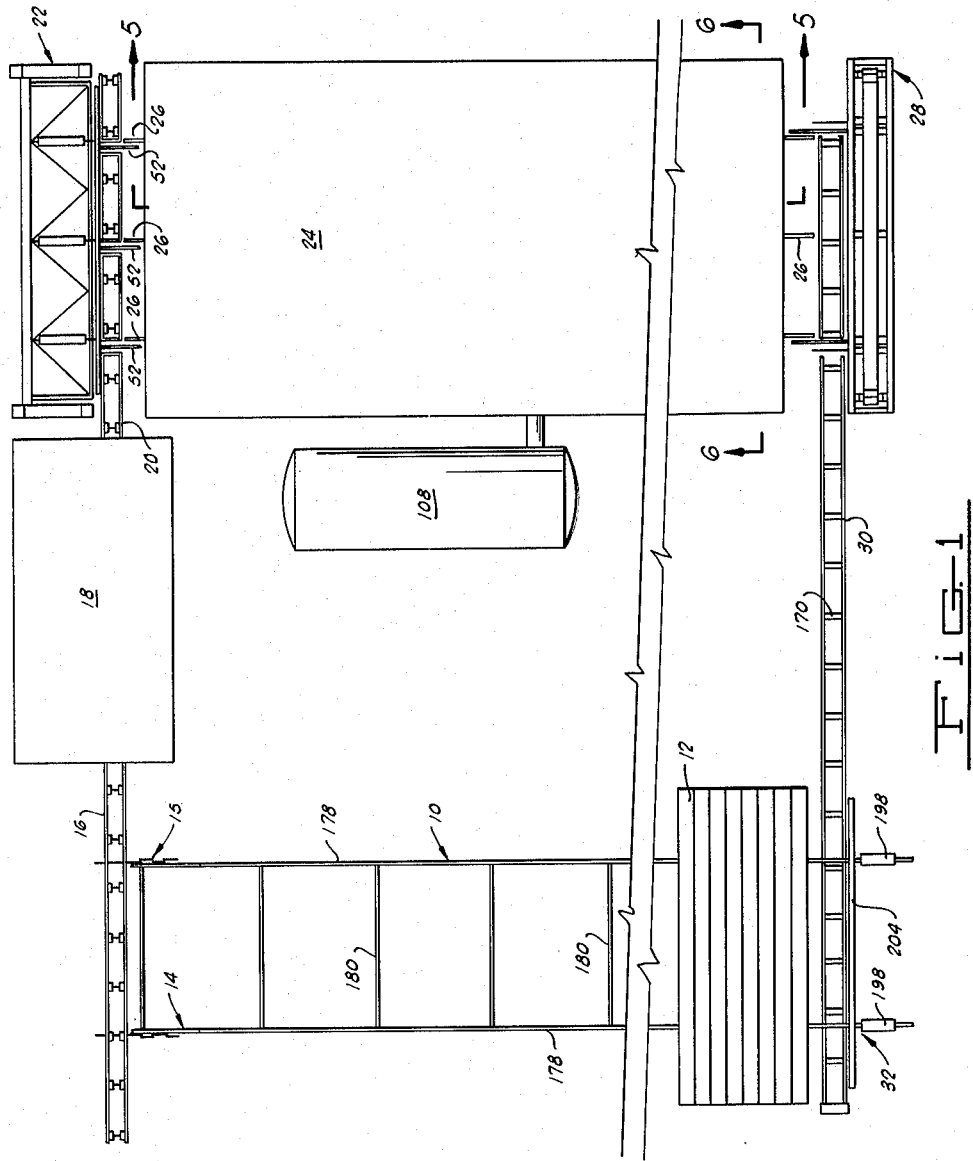

Before proceeding to a description of the detailed construction of the various portions of the present invention, reference should be made to the schematic plan view in FIG. 1. In this drawing, reference character 10 designates generally a storage rack upon which a plurality of elongated, channel-shaped pallets 12 are stored in parallel juxtaposition. The empty pallets are pushed in a manner subsequently to be described to one end 14 of the storage rack 10 and are there transferred by a novel pallet release device 15 from the storage rack 10 onto a trackway 16. The trackway 16 supports and guides the individual pallets 12 as they are moved lengthwise into a mixing and molding device designated generally by reference character 18.

In the mixing and molding device 18, a mixture of sand and aggregate is molded in place upon the upper surface of each pallet 12 in the shape of the pre-cast stone which it is desired to produce. The pallets 12 bearing the molded uncured stone 19 (see FIG. 3) are then consecutively moved out of the mixing and moulding device 18 onto a second trackway 20 and are supported and guided by the trackway 20 as they are moved between a kiln loading mechanism 22 and a kiln 24. The loading mechanism 22 lifts each individual pallet 12 upwardly until it is horizontally aligned with one of the pallet-supporting tiers (later described) in the kiln 24, and then moves the pallet horizontally into the kiln where it is deposited on the tracks of the pallet-supporting tier. When enough of the pallets 12 have been pushed into the kiln 24 by the loading mechanism 22 to completely fill one of the tiers of the kiln, loading of the kiln is ceased and the curing process commenced.

When the process of curing the stone 19 in the kiln 24 has been completed, the loading mechanism 22 is again actuated and additional pallets 12 supporting uncurred stone are pushed into the kiln. As additional pallets 12 are pushed horizontally into the kiln 24 by the loading mechanism 22, the pallets which carry the cured stone 19 are pushed out of the opposite end of the kiln upon the tracks 26 which project outwardly therefrom. A novel unloading mechanism 28 is then utilized to lift each individual pallet 12 from the tracks 26 and lower it onto a pallet conveyor 30 which conveys the pallet bearing the cured stone 19 to a position adjacent the pallet storage rack 10. The pallets 12 are then transferred by a hydraulically actuated transfer mechanism 32 onto the storage rack 10 from the conveyor 30. The cured stone 19 may be removed from the pallets 12 while the pallets are standing on the storage rack 10 and before the reach the end 14 of the storage rack for transfer to the trackway 16. The cycle of the pallets 12 through the system is thus completed.

*Kiln and kiln loader*

Figure 4:
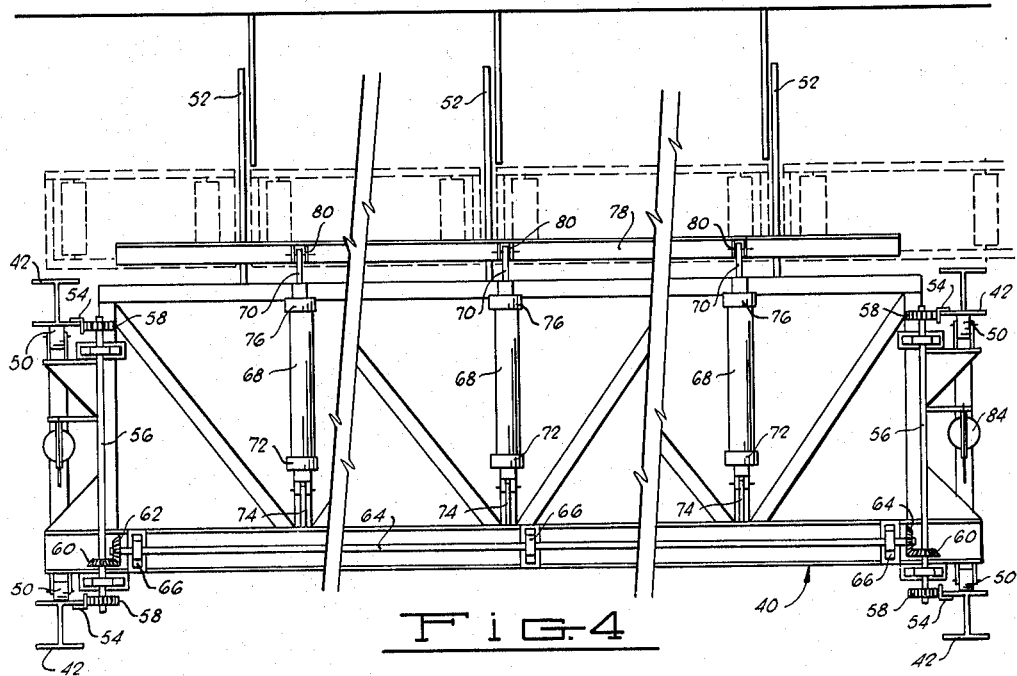

The kiln loading mechanism 22 is illustrated in detail in FIGS. 2, 3 and 4 and comprises a pair of spaced, vertically extending frames 38 which function as tracks or guideways for a horizontal, vertically moving pallet carriage 40 which extends therebetween. The frames 38 may suitably be constructed of a pair of upright I-beams 42 interconnected at their tops and bottoms by channel members 44 and 46, respectively, and provided with suitable cross bracing 48. The horizontal pallet carriage 40 may also be a generally rectangular framework provided with rollers 50 at each end thereof positioned to track upon the I-beams 42 of the vertical frames 38 when the horizontal pallet carriage is moved upwardly and downwardly. A plurality of horizontally extending arms 52 project from one side of the pallet carriage 40 toward the kiln 24. The arms 52 are spaced from each other and are oriented with respect to the trackway 20 so that the arms may pass downwardly through spaced sections of the trackway. The arms 52 are also arranged to clear the projecting tracks 26 of the kiln 24 (as shown in FIG. 4) when the pallet carriage 40 is moved upwardly.

As will be noted in referring to FIG. 4, an angle iron 54 carrying a plurality of gear teeth is welded to one of the flanges of each of the I-beams 42. A shaft 56 having a gear wheel 58 secured to each of its ends is mounted upon each end of the pallet-supporting member 40 in a position such that the teeth of the wheels 58 engage the teeth upon the respective adjacent angle irons 54. The shafts 56 each also carry a bevel gear 60 which is spaced inwardly from the back side of the pallet carriage 40 in a position to mesh with bevel gears 62 carried at each end of a shaft 64. The shaft 64 is supported on one of the longitudinal eye-beams of the pallet carriage 40 and is rotatably journalled in bearings 66. As will be subsequently explained, the shafts 56 and 64 and the gears 58, 60 and 62 function to maintain the pallet carriage 40 level during its vertical movement.

A plurality of hydraulic cylinders 68 extend transversely across the pallet carriage 40 with their respective piston rods 70 extending in a direction toward the kiln 24 and parallel to the arms 52. The butt end 72 of each of the hydraulic cylinders 68 is secured to a bracket 74 welded to the pallet carriage framework. The forward end 76 of each of the hydraulic cylinders 68 is welded or otherwise suitably secured to the forward portion of the pallet carriage framework, and it will be noted from FIGS. 2 and 3 that the cylinders are inclined slightly with respect to the horizontal so that the forward end 76 of the cylinder is slightly lower than the butt end 72. The reason for this arrangement will be subsequently explained.

An elongated piece of large angle iron 78 extends across the arms 52 in a direction normal thereto and is secured by means of suitable brackets 80 to the free end of each of the piston rods 70. Each of the hydraulic cylinders 68 is double acting in its function so that the piston rods 70 may be extended to push the angle iron pusher bar 78 across the arms 52 toward the kiln 24 and may also be retracted into the cylinders to withdraw the pusher bar toward the pallet carriage 40 and away from the kiln.

For the purpose of raising and lowering the pallet carriage 40, a hydraulic cylinder 84 is mounted in a vertically extending position upon each of the vertical frames 38. A cable 86 is reeved over a sheave 88 carried by the piston rod 90 of each of the hydraulic cylinders 84 and is secured at one of its ends to a bracket 92 attached to the pallet carriage 40. The other end of the cable 86 is secured to a bracket 94 welded to the horizontal member 46 of the vertical framework 38 so that a double purchase of the cable is utilized in raising and lowering the pallet carriage 40.

Figure 6:
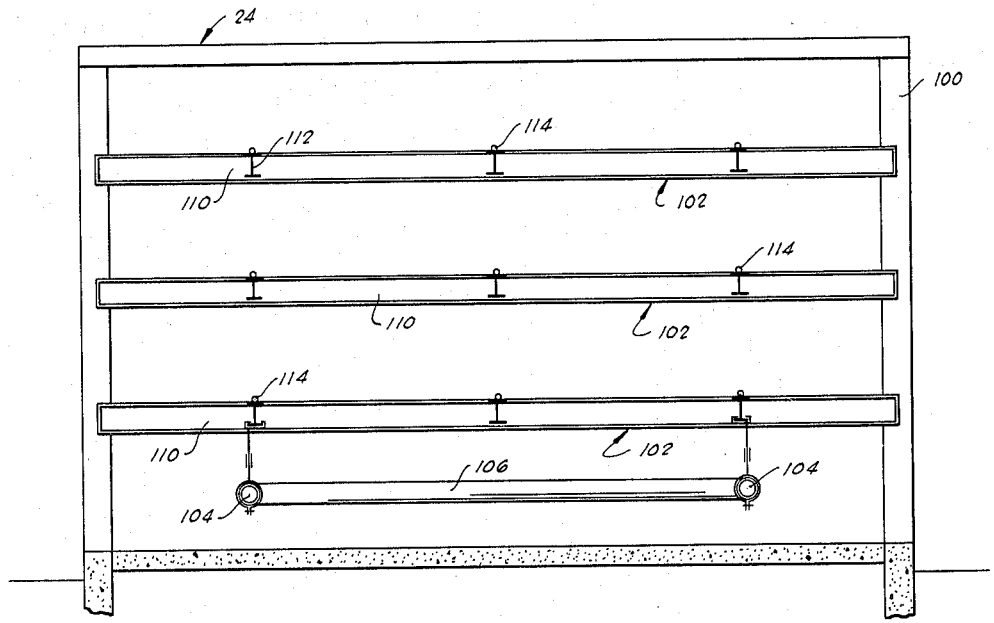

The kiln 24 which is utilized to cure the pre-cast stone is illustrated in FIGS. 5 and 6. In a preferred embodiment of the invention, the kiln comprises a rectangular housing 100 which contains a plurality of horizontal, vertically spaced pallet-supporting tiers designated generally by reference character 102. In the lower portion of the kiln beneath the several pallet-supporting tiers 102, are a pair of perforated steam pipes 104 which extend substantially the entire length of the kiln on each side thereof. A transverse steam supply pipe 106 communicates with each of the perforated pipes 104 and is connected to a boiler located outside and alongside of the kiln 24 as shown in FIG. 1.

Each of the pallet-supporting tiers 102 comprises a plurality of horizontally spaced I-beams 110 which extend transversely across the kiln and three longitudinally extending I-beams 112 which are supported by the transverse beams 110. Elongated rods 114 of circular cross section are welded to the upper surface of each of the longitudinally extending I-beams 112 and function as tracks for supporting the pallets 12 when they are pushed into the kiln by the kiln loading mechanism 22. As illustrated in FIGS. 3, 5 and 9, triangular supporting brackets 116 are secured to the ends of each of the longitudinal beams 112 and support a portion 118 of each of the rods 114 which projects beyond each end of the kiln. At the open ends of the kiln from which the projecting portions 118 of the rods 114 extend, hingedly supported flaps 120 are provided to prevent the escape of steam from the kiln. The steam flaps 120 pivot to permit pallets to be slid into and out of the kiln.

*Operation of kiln and kiln loader*

One of the elongated, channel-shaped pallets 12 is initially moved along the trackway 16 into the mixing and molding device 18. As shown in the accompanying drawings, the trackways 16 and 20 may suitably comprise a plurality of rotatably mounted rollers spaced to fit into the channel-shaped pallets 12 although, of course, other types of trackway may be used, provided the pallet is supported with sufficient stability. The mixing and molding device 18 may be any type which is suitable for forming the uncured building stone on the flat upper surface of the pallets 12 such, for example, as the apparatus bearing the trade name "Linolator" and manufactured by the Lamson and Sessions Company of Cuyahoga Falls, Ohio. After the stone 19 has been molded on the pallet 12, the pallet is moved out of the mixing and molding device 18 onto the trackway 20. When the pallet 12 reaches a position at the end of the trackway 20 between the loading device 22 and the kiln 24, its movement is arrested.

As shown in FIGS. 1 and 4, the trackway 20 is sectioned opposite the loading device 22 so that the arms 52 of the pallet carriage 40 can pass vertically through the trackway. Thus, when the hydraulic cylinders 84 are actuated, the pallet carriage 40 moves upwardly, lifting the pallet 12 at the end of the trackway 20 upwardly on the arms 52. The pallet carriage 40 may be stopped in its vertical movement opposite any of the several vertically spaced tiers 102 of the kiln 24. As each pallet 12 is lifted upwardly, it occupies a position on the arms 52 immediately adjacent the angle iron pusher bar 78. This relationship is most clearly shown in FIG. 3. The upward movement of the pallet carriage 40 proceeds smoothly as the carriage tracks on the I-beams 42, the gearing 58, 60 and 62, and interconnecting shafting maintain the carriage level.

When the pallet carriage 40 has been stopped at a position in which the arms 52 are horizontally aligned with the tracks 114 of one of the tiers 102 of the kiln, the hydraulic cylinders 68 mounted upon the carriage are actuated and the angle iron pusher bar 78 is slid slowly across the arms 52. As the pusher bar 78 moves across the arms 52, the pallet 12 and the uncured stone 19, its supports are pushed ahead of the pusher bar until the pallet rests upon the projecting portions 118 of the tracks 114 of the appropriate kiln tier 102. Further pushing by the pusher bar 78 moves the pallet 12 through the hinged steam flap 120 and into the kiln. The piston rods 70 of the hydraulic cylinders 68 are then retracted to return the pusher bar 78 to its initial position. Finally, the actuation of the hydraulic cylinders 84 is reversed to lower the pallet carriage 40 to its original position beneath the trackway 20.

When a stone 19 has been molded upon the next succeeding pallet 12, this pallet is moved to the end of the trackway 20 and again the pallet carriage 40 is elevated to lift the pellet to the level of the tier 102 of the kiln which is being loaded. The hydraulic cylinders 68 on the pallet carriage are then actuated to drive the pusher bar 78 across the arms 52 and push the pallet 12 onto the tracks 114. The second pallet 12 which is loaded will bear against the first pallet placed on the tracks 114 and push it further into the kiln 24. The process of loading pallets 12 individually into the kiln 24 with the resultant pushing of the initially loaded pallets further into the kiln is continued until one tier 102 of the kiln 24 is completely filled with pallets in juxtaposition to each other. The downward inclination of the hydraulic cylinders 68 which has been referred to above functions to prevent the pallets 12 from buckling or jumping up out of position when a large number of them are being pushed further into the kiln 24.

The pallets 12 which are loaded on the initially filled tier 102 may then be cured or, alternately, the other tiers may be loaded with pallets in the same manner as the first tier before curing is commenced. The latter procedure may be conveniently followed by virtue of the curing conditions generally applied to the stone. Thus, in curing the stone, it is allowed to stand in the kiln 24 for from four to twelve hours before steam treatment is started. The kiln 24 is then filled with steam for a period of about five and one-half hours. After this, the stone is allowed to cool for a period of from seven to twelve hours while still standing in the kiln. From this it may be seen that the range of standing times before and after steam treatment are such that the two lower tiers 102 may be loaded and unloaded before the standing time of the stone in the upper tier 102 has exceeded the maximum standing time specified. It should also be noted that although the accompanying drawings depict a kiln 24 having a source of steam located in the lower portion of the kiln, it may be desirable in some circumstances to completely partition the several tiers 102 of the kiln from each other and provide a separate steam supply for each tier.

After the stone in the kiln 24 has been subjected to the curing treatment just described, the process of loading pallets 12 into the kiln is resumed. As new pallets 12 carrying uncured stone are pushed into the kiln 24, the pallets already in the kiln and supporting cured stone are pushed through the steam flap 120 at the discharge end of the kiln and out onto the projecting portions 118 of tracks 114. These latter pallets are then removed by the novel kiln unloading mechanism now to be described.

*Kiln unloading device*

The kiln unloading device of the present invention is illustrated at FIGS. 7 through 10. The unloading device comprises a pair of horizontally spaced, vertically extending I-beams 121 and a horizontal pallet carriage 122 which extends between the I-beams 121. The pallet carriage 122 is a rectangular framework of interconnected I-beams and carries a plurality of rollers 124 at each of its ends positioned to track upon the flat surfaces of the I-beams 121 as the pallet carriage is moved vertically. Two horizontally spaced, parallel arms 126 are secured to one side of the pallet carriage 122 and extend toward the kiln 24.

An angle iron 128 having teeth 130 welded along one of its flanges is welded to one flange of each of the I-beams 121. An elongated shaft 132 extends longitudinally across the pallet carriage 122 and is rotatably journalled in brackets 134 secured to the pallet carriage. At each of its ends the shaft 132 is secured to a gear wheel 136, the teeth of which mesh with the teeth 130 carried by the respective angle irons 128.

Spaced inwardly from the ends of the pallet carriage 122, each of the longitudinal I-beams of the pallet carriage is provided with aligned apertures which accommodate hydraulic cylinders 138 which are mounted therein. The butt ends 139 of the cylinders 138 are secured to brackets 140 welded to the pallet carriage 122 and the piston rods 142 of each of the hydraulic cylinders 138 extend toward the kiln 24 and alongside and parallel to the arms 126. At their free ends, the piston rods 142 are each attached to vertically extending dogs 144. It will be noted in referring to FIG. 9 that the upper end of each of the dogs 144 is located above the level of the upper surface of the arms 126. The purpose of this arrangement will be subsequently explained.

In order to move the pallet carriage 122 vertically, a hydraulic cylinder 146 is secured in a vertically extending position to one of the vertical I-beams 121. The piston rod 148 of the hydraulic cylinder 146 carries a pair of sheaves 150 at its free end, and sheaves 152, 153 and 154 are also mounted atop the vertically extending I-beams 121. Cables 156 are then reeved about the several sheaves 150, 152, 153 and 154 in the manner most clearly illustrated in FIGS. 7 and 8, and are secured at one of their ends to the opposite ends of pallet carriage 122, and at their other end to the upper portion of the vertical I-beam 121 which supports the hydraulic cylinder 146.

Operation of the kiln unloading device

In many respects, the operation of the kiln unloading device 28 is similar to that of the kiln loading device 22. After the pallets 12 bearing the cured stone 19 have been pushed out of the kiln 24 onto the projection portions 118 of the tracks 114, the pallet carriage 122 of the kiln unloading device 28 is moved upwardly by actuating the hydraulic cylinder 146. As the piston rod 148 of the hydraulic cylinder 146 is retracted, the cables 156 pull up on the pallet carriage 122, causing it to move upwardly on the vertically extending I-beams 121. As the pallet carriage 122 moves upwardly, the arms 126 and piston rods 142 pass through the conveyor 30 which is sectioned to permit such passage in much the same way that the trackway 20 is sectioned to permit passage of the arms 52 of the kiln loading device 22. The upward movement of the pallet carriage 122 of the kiln unloader is relatively smooth and even by virtue of the tracking function of the rollers 124 and the leveling function of the shaft 132 and its gear wheels 136.

When the pallet carriage 122 has been elevated to a position where the arms 126 are aligned with the projecting portions 118 of the tracks 114 which support the pallets 12 to be removed from the kiln, the dogs 144 carried by the piston rods 142 of the hydraulic cylinders 138 will project upwardly into the channel-shaped pallets 12. This relationship is shown in FIG. 9 of the drawings. The hydraulic cylinders 138 are then actuated to retract piston rods 142 into the cylinders. This movement pulls the pallets supporting cured stone 19 off of the projecting portions 118 of tracks 114 and onto the arms 126. As soon as the pallets 12 have been pulled inwardly far enough to clear the projecting portions 118 of the tracks 114, the pallet carriage 122 may be lowered. As the pallet carriage 122 passes downwardly through the conveyor 30, the pallet is left resting upon the conveyor and may then be removed by the conveyor from between the kiln unloading device 28 and the kiln 24.

From the discussion of the system thus far, it will be apparent that some synchronism must obtain between the actuation of the kiln unloading device 28 and the kiln loading device 22. Thus, as pallets 12 bearing uncured stone are loaded into the kiln 24, other pallets supporting cured stone are pushed out upon the projecting portions 118 of tracks 114 at the other end of the kiln. It is therefore essential that the unloading device be operative to remove one pallet from the kiln as one pallet is loadd into the kiln at the opposite end thereof. This synchronism may be obtained by operators who are practiced in the procedure of loading and unloading the kiln or, more desirably, the kiln loading and unloading devices 22 and 28, respectively, may be hydraulically interconnected so that the loading and unloading actions proceed simultaneously and synchronously.

*Pallet conveyor, pallet storage rack, and apparatus for transferring pallets from pallet conveyor to pallet storage rack*

Figure 12:
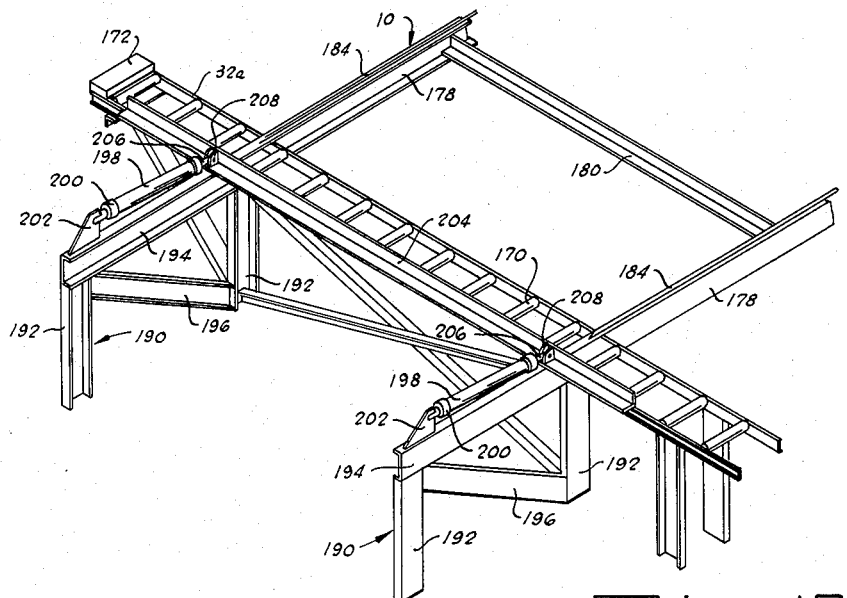
FIGURE 12 is a perspective view of a portion of the pallet storage rack, and of the device which is utilized to transfer pallets from the pallet conveyor to the pallet storage rack.
Figure 8:
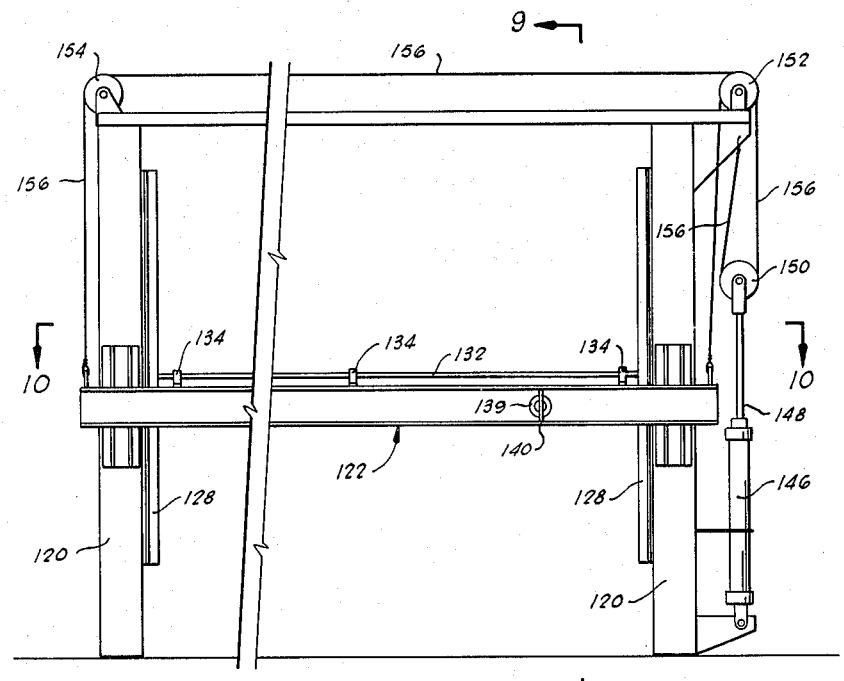

Although the pallet conveyor 30 may be of any suitable type, provided it is sectioned at its end adjacent the kiln 24 to permit the arms 126 of the kiln unloading device 28 to pass therethrough, the pallet conveyor 30 of the preferred embodiment illustrated in FIGS. 1, 12 and 13 comprises a roller-type conveyor having a series of horizontally spaced, individually leveling rollers 170 which function as supporting members for the pallets carrying the cured stone 19 from the kiln. The rollers 170 may be powered in any suitable way, such as by a chain and socket drive (not shown), or the conveyor 30 may simply be slightly inclined to allow the pallets to move down the conveyor by gravity. At its ends 32a opposite the kiln 24, the conveyor 30 carries an arresting block 172 to halt the movement of the pallet 12 along the conveyor.

The pallet storage rack 10 extends normal to the pallet conveyor 30 and comprises a plurality of vertical supporting members 174 which support elongated parallel beams 178. Transverse reinforcing members 180 (see FIG. 1) interconect the beams 178 and further reinforcement is afforded by the diagonal braces 182 (see FIG. 11). At the end of the pallet storage rack 10 which is adjacent the conveyor 30, the beams 178 are very slightly lower than the upper surface of the rollers 170 and extend through the conveyor 30 so that the pallets 12 may be easily slid off of the conveyor onto the storage rack. To decrease the frictional resistance of the beams 178 to the sliding movement of the pallets 12 thereon, rods 184 of circular cross section are welded or otherwise suitably secured to the upper surface of the beams 178. It will be noted in referring to FIG. 11 that the end portion 14 of the pallet storage rack 10 adjacent the trackway 16 is inclined downwardly toward the trackway. The purpose of this inclined portion is to allow empty pallets 12 to be transferred one at a time to the trackway 16 by a novel pallet release mechanism 15 subsequently to be described.

Directly opposite from the pallet storage rack 10 on the opposite side of the conveyor 30, a pair of horizontally spaced, vertically extending frameworks 190 are aligned with the beams 178 of the storage rack 10. The frameworks 190 each comprises a pair of vertical supporting members 192, a channel member 194 across the top of the supporting members, and suitable diagonal bracing 196. If desired, the channel members 194 and horizontal beams 178 of the storage rack may be of unitary construction so that the channel members merely comprises extensions of the pallet rack beams.

A hydraulic cylinder 198 is mounted on the top of each of the frameworks 190 in the manner most clearly illustrated in FIG. 12. The butt ends 200 of the hydraulic cylinders 198 are secured to brackets 202 which are welded to the upper surface of the channel members 194. An angle iron pusher bar 204 extends across the channel members 194 in a direction normal thereto, and the piston rods 206 of the hydraulic cylinders are each attached to the pusher bar by means of suitable brackets 208.

In a preferred embodiment of the invention, the round rods 184 which are secured to the upper surface of the beams 178 are terminated just inside the outer edge of the conveyor 30. This construction is most clearly depicted in FIG. 13. Similar rods 210 are also secured to a portion of the upper surface of the channel members 194 and extend to a point just inside the conveyor 30. All of the rods 184 and 210 are dimensioned so that their upper surface is substantially co-planar with the upper surface of the rollers 170 of the conveyor 30, and are tapered to a flat edge at their ends projecting inside the conveyor 30 (see FIG. 12). This allows the pallets to be transferred smoothly and easily from the conveyor 30 onto the pallet storage rack 10 in the manner next to be described.

*Operation of the pallet conveyor, pallet transfer device and pallet storage rack*

After a pallet 12 supporting cured stone 19 has been lowered by the kiln unloading device 28 onto the conveyor 30, the pallet moves down the conveyor until it is stopped by contact with the block 172. The hydraulic cylinders 198 are then actuated to push the pusher bar 204 across the conveyor 30 toward the pallet storage rack 10. The pallet 12 is, of course, pushed ahead of the pusher bar 204 until it rests upon the rods 184. The piston rods 206 of the cylinders 198 are then retracted to return the pusher bar 204 to its original position. As soon as a new pallet 12 moves opposite the storage rack 10 on the conveyor 30, the hydraulic cylinders 198 are again actuated to push the pallet onto the storage rack.

It will be noted that as successive pallets 12 are pushed off the conveyor 30 and onto the pallet storage rack 10, all of the pallets which have previously been placed on the rack will be pushed along the rack toward the inclined end portion 14 thereof. The process of pushing all of pallets along the storage rack 10 is continued until such time as the kiln 24 has been completely unloaded. Since the number of pallets which the pallet transfer mechanism 32 must push during its reciprocating stroke may become quite large, the hydraulic cylinders 198 are inclined downwardly slightly from their butt-ends 200 toward the conveyor 30 so that the pallets on the rack 10 will not buckle upwardly or jump out of position.

The cured stone may conveniently be removed from the pallets 12 while the pallets are resting upon the pallet storage rack 10. In this way, when the pallets reach the inclined end portion 14 of the storage rack 10 they are empty and ready to be transferred onto the trackway 16 for recycling through the mixing and molding device 18. As the pallets are pushed toward the end of the pallet storage rack, they pass onto the inclined portion 14 and gravitate toward the trackway 16. Before reaching the trackway 16, however, the movement of the pallets is arrested by the novel pallet release mechanism 15 now to be described.

*Pallet release mechanism*

Figure 14:
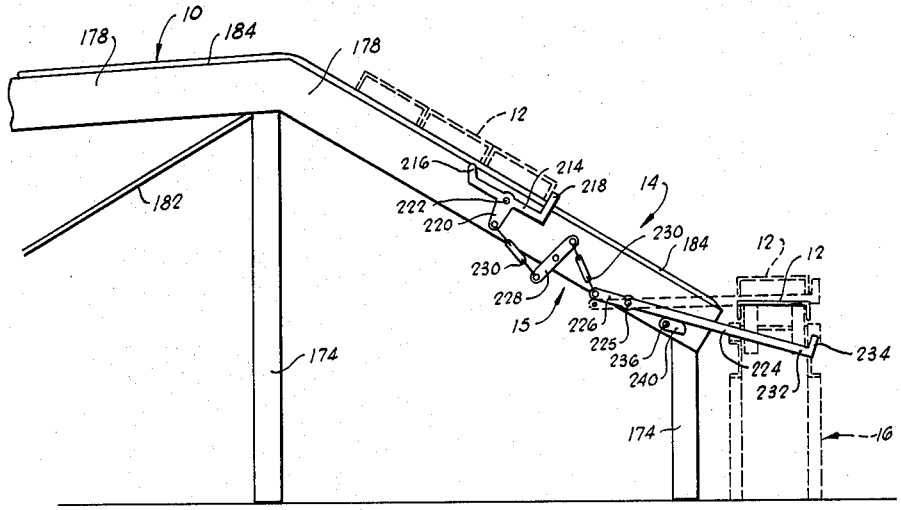
FIGURE 14 is a view in elevation of the pallet release device utilized for transferring pallets from the pallet storage rack to a trackway.
Figure 15:
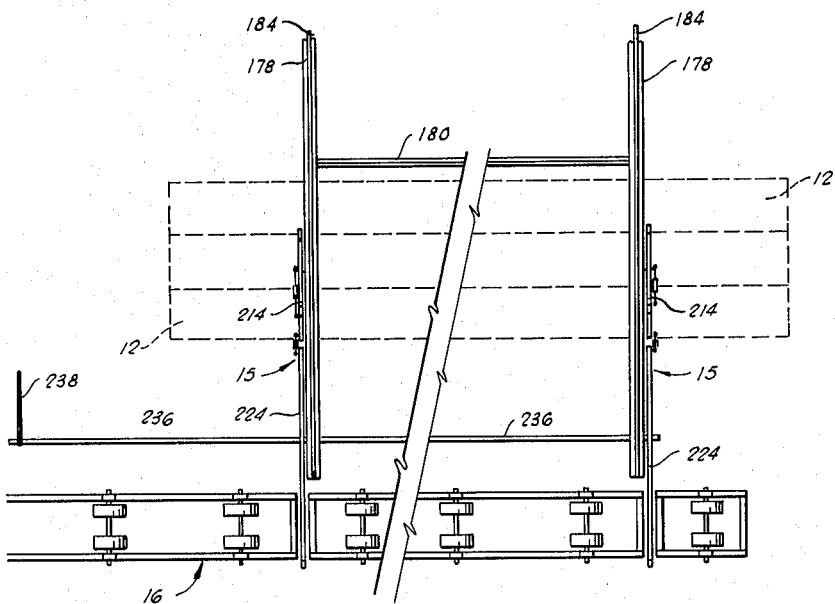
FIGURE 15 is a plan view of the pallet release device shown in FIG. 14.

The pallet release mechanism 15 which is employed to retain the pallets 12 on the inclined portion 14 of the storage rack 10, and then to release them one at a time for transfer to the trackway 16 is illustrated in FIGS. 14 and 15. The pallet release mechanism 15 includes a pair of pivoted rocker arms 214 secured to the outer sides at the beams 178 of the pallet storage rack 10 as shown in FIG. 15. Each of the pivoted rocker arms 214 is provided with retaining toes 216 and 218 at each of its ends and with a central actuating arm 220 aligned with its pivot point 222. The retaining toes 216 and 218 are so dimensioned and spaced from each other that pivotation of the rocker arms in one direction brings retaining toe 218 upward into the path of the leading pallet 12 and prevents the pallets from sliding further down the inclined portion 14 of the pallet storage rack 10. When the rocker arms 214 are pivoted in the opposite direction, the retaining toe 218 moves downwardly to release the leading pallet 12, but the other retaining toe 216 is moved upwardly to intercept the next succeeding pallet to prevent it from following the leading pallet down the incline. It is believed that this operation of the rocker arms 214 will be apparent from FIG. 14 which depicts the rocker arm located on one side of the pallet storage rack 10.

The mechanical linkage used to actuate each of the rocker arms 214 comprises an elongated shaft 224 which is pivoted about a point 225 relatively close to the end 226 thereof nearest adjacent the respective rocker arm, a pivoted member 228, and a pair of turnbuckles 230 interconnecting the ends of the pivoted member 228 with the actuating arm 220 of the rocker arm 214 and the end 226 of shaft 224. At its unconnected end 232, the shaft is provided with an upwardly projecting toe 234, the function of which will be subsequently explained. A cam shaft 236 passes through apertures (not seen) in the sides of the beams 178 and projects a substantial distance to one side of the pallet storage rack 10 as shown in FIG. 15. A handle 238 is secured to the projecting end of the cam shaft 236 to permit the shaft to be rotated about its longitudinal axis. Immediately beneath the shafts 224, cam plates 240 are rigidly secured to the cam shaft 236. The configurations of the cam plates 238 are such that as the cam shaft 236 is rotated counterclockwise, the cam plates 238 bear against the shafts 224, causing them to pivot counterclockwise about their pivot points 225. The extent of the pivotal movements of the shafts 224 is such that they are moved into alignment with the upper surface of the trackway 16 and into the path of the downwardly sliding pallet 12.

*Operation of the pallet release device*

As has previously been stated, the pallet transfer device 32 continues to push the pallets 12 along the pallet storage rack 10 until some of the pallets reach the inclined portion 14 of the rack. The leading pallets 12 which have reached the inclined portion 14 then slide down the incline until they contact the retaining toes 218 of rocker arms 214. When an operator pivots the operating handle 238 of the pallet release mechanism 15, the shafts 224 are pivoted so that their end portions 232 are moved upwardly into the position shown in dashed lines in FIG. 14. Simultaneously, the rocker arms 214 are pivoted to release the leading pallet 12. The next succeeding pallet is stopped by the retaining toes 216 of the rocker arms 214. It will be noted that the degree of pivotation or throw of the rocker arms 214 can be easily adjusted by manipulation of the turnbuckles 230.

After its release, the leading pallet moves down the inclined portion 14 of the rack 10 and then across the end portions 232 of shafts 224 until its movement is arrested by the toes 234. When the pallet is in this position on the shafts 224, it is directly over the trackway 16. The operator then pivots the operating handle 238 in the opposite direction so that the pallet 12 is lowered onto the rollers of trackway 16 and occupies the position shown in FIG. 14. At the same time, retaining toes 218 are again returned to their retaining positions in the path of the leading pallet 12 on the inclined portion 14 of the pallet support rack 10. As soon as the pallet 12 which is on the trackway 16 is moved away from the pallet rack 10 toward the mixing and molding device 18, another pallet 12 is released and transferred to the trackway.

From the foregoing description it will be apparent that a highly efficient system for manufacturing pre-cast building stone is provided by the present invention. Since the pallets 12 supporting the stone 19 prior to curing are moved smoothly and without vibration into the kiln 24, very few of the stones must be discarded because of cracking or crumbling. Moreover, the system permits almost continuous molding and curing, and the kiln is constructed to accommodate a substantially greater number of the pallets than has been the case with previous kilns. The arrangement of the several components of the system is such that relatively little space is required for installation. Finally, automatic handling of the pallets greatly reduces the number of operating personnel required to manufacture the stone.

In the description of this invention, the elements and combinations of elements in the system have been described as they specifically appear in the preferred embodiments illustrated by the accompanying drawings. However, numerous substitutions, alterations and modifications can, of course, be made in these components of the system by those skilled in the art without departure from the concepts and principles underlying the invention. Insofar as such changes involve merely the use of equivalent structures, they are considered to fall within the scope of the invention as defined by the appended claims.

I claim:

1. In a system for producing pre-cast building stone, the combination comprising:

a plurality of elongated pallets for supporting said stone during the curing thereof;

means for molding said stone on said pallets, said molding means having an inlet end for receiving said pallets, and an outlet end from which pallets bearing molded, uncured stone are discharged;

a first horizontal elongated trackway extending to the inlet end of said molding means for supporting and guiding a series of elongated pallets aligned longitudinally thereon as they are moved sequentially into said molding means;

a second horizontal elongated trackway for supporting and guiding in horizontal alignment therealong, elongated pallets discharged from said molding means, said second horizontal elongated trackway including a plurality of horizontally spaced sections;

a kiln for curing stone in place on said pallets, said kiln having an entrance end and a discharge end, and having at least one pallet receiving tier disposed above said second horizontal trackway;

means for lifting a pallet from said second horizontal trackway and moving said pallet horizontally into said kiln, said means including vertically movable pallet carriage means including horizontally extending arms each movable in a vertical plane between said horizontally spaced sections to facilitate lifting said elongated pallets from said second trackway;

an elongated pallet supporting rack having one of its ends located adjacent said first trackway, and having its other end remotely located with respect to said first trackway;

means for automatically transferring single pallets one after the other from said rack to said first trackway, to facilitate longitudinal alignment of said pallets on said first trackway;

conveyor means extending between the discharge end of said kiln and said other end of the pallet supporting rack;

means for removing a pallet supporting cured stone from said kiln and placing said pallet upon said conveyor means; and means for moving a pallet off said conveyor means and onto said rack.

2. In a system for producing pre-cast building stone, the combination comprising:

a plurality of elongated pallets for supporting said stone during the curing thereof;

means for molding said stone on said pallets, said molding means having an inlet end for receiving said pallets, an outlet end from which said pallets bearing molded, uncured stone are discharged;

a first horizontal elongated trackway extending to the inlet end of said molding means for supporting and guiding a series of elongated pallets aligned longitudinally thereon as they are moved sequentially into said molding means;

a second horizontal elongated trackway for supporting and guiding in longitudinal alignment therealong elongated pallets discharged from said molding means, said second horizontal elongated trackway having a plurality of horizontally spaced sections;

a kiln for curing stone in place on said pallets, said kiln having an entrance end and a discharge end, and having at least one pallet receiving tier disposed above said second horizontal trackway;

a pair of horizontally spaced, vertically extending track means positioned adjacent the horizontally spaced sections of said second horizontal elongated trackway;

vertically movable, horizontal pallet carriage means extending betwen said pair of spaced track means and guiding on siad spaced track means in moving upwardly and downwardly;

means for moving said horizontal pallet carriage means vertically on said track means;

means on said horizontal pallet carriage means for horizontally pushing a pallet off said carriage means and onto said tier in said kiln;

an elongated pallet supporting rack having one of its ends located adjacent said first trackway, and having its other end remotely located with respect to said first trackway;

means for automatically transferring single pallets one after the other from said rack to said first trackway to facilitate longitudinal alignment of said pallets on said first trackway;

conveyor means extending between the discharge end of said kiln and said other end of the pallet supporting rack;

means for removing a pallet supporting cured stone from said kiln and placing the pallet removed from said kiln upon said conveyor means; and means for removing a pallet off of said conveyor means and onto said pallet supporting rack.

3. A system as claimed in claim 2 wherein said second trackway comprises a plurality of horizontally spaced pallet supporting members; and wherein said pallet carriage means comprises a rectangular framework having a plurality of spaced horizontal arms extending therefrom toward said kiln, said arms being oriented to pass between the pallet supporting members of said second trackway when said carriage means is moved vertically; and wherein said means for horizontally pushing a pallet off said carriage means comprises an elongated pusher bar extending across said arms in a direction parallel to said second trackway and normal to said arms, and hydraulic cylinder means connected between said rectangular framework and said pusher bar for pushing said bar toward said kiln along said arms and, alternately, withdrawing said bar toward said framework and away from said kiln along said arms.

4. Semi-automatic rapid loading and unloading kiln apparatus for use in curing pre-cast building stone comprising a plurality of elongated pallets for supporting the building stone; a kiln housing; means for introducing steam into said housing for curing said stone; at least one horizontal, pallet-supporting tier in said housing; horizontal tracks extending from said tier out of two opposite sides of said housing; loading means adjacent one of said opposite sides for lifting pallets carrying uncured stone to the level of said tier and for pushing the pallets so lifted onto the horizontal tracks extending from said tier; and unloading means adjacent the other of said opposite sides for sliding pallets supported on the tracks extending from said tier off of said supporting tracks, and for lowering the pallets so removed from the tracks to a desired lower level.

5. A kiln apparatus as claimed in claim 4 wherein said loading means comprises a pair of horizontally spaced, vertically extending track means; vertically moveable pallet carriage means extending between said spaced track means and guiding on said track means in moving upwardly and downwardly; means for moving said carriage means vertically; and means on said carriage means for horizontally pushing a pallet off said carriage means and into said kiln.

6. A kiln apparatus as claimed in claim 5 wherein said pallet carriage means comprises a rectangular framework having a plurality of spaced horizontal arms extending therefrom toward said kiln, and gear means on said rectangular framework and cooperating with both of said track means to maintain said rectangular framework level; and wherein said means for horizontally pushing a pallet off said carriage means comprises an elongated pusher bar extending across said arms in a direction normal thereto, and hydraulic cylinder means connected between said rectangular framework and said pusher bar for pushing said bar toward said kiln along said arms, and, alternately, withdrawing said bar toward said framework and away from said kiln along said arms.

7. A kiln apparatus as claimed in claim 4 wherein said unloading means comprises a pair of horizontally spaced, vertically extending track means; vertically moveable, horizontal pallet carriage means extending between said spaced track means and guiding on said track means in moving upwardly and downwardly; means for moving said carriage means vertically, and means on said carriage means for horizontally pulling a pallet out of said kiln and onto said carriage means.

8. A kiln apparatus as claimed in claim 7 wherein said horizontal pallet carriage means comprises a rectangular framework having a plurality of spaced horizontal arms extending therefrom toward said kiln, and gear means on said framework cooperating with both of said track means to maintain said rectangular framework level; and wherein said means for pulling a pallet out of said kiln comprises hydraulic cylinder means connected at one of its ends to said rectangular framework, and dogs on the other end of said hydraulic cylinder means for sliding said pallets off said supporting tracks and onto said arms when said hydraulic cylinder means is actuated.

9. Apparatus for unloading elongated pallets from a kiln used for curing pre-cast stone in place on said pallets comprising a pair of horizontally spaced, vertically extending beams; a vertically moveable horizontal framework extending between said beams and guiding thereon during vertical movement; a plurality of horizontal arms extending from one side of said framework toward said kiln; means for moving said horizontal framework vertically; and means attached to said framework for pulling a pallet across said arms toward said framework and away from said kiln.

10. Apparatus as claimed in claim 9 and further characterized to include rollers at each end of said horizontal framework positioned to track and guide on said beams when said framework is moved vertically; gear teeth on said beams; and interconnected gear means secured to each end of said horizontal framework and meshing with said gear teeth during vertical movement of said framework to maintain said framework level.

11. Apparatus as claimed in claim 9 wherein said means for pulling a pallet across said arms comprises at least two horizontally spaced hydraulic cylinders rigidly secured to said framework; a piston rod extending from each of said cylinders toward said kiln and parallel to said arms; and a dog projecting upwardly from the free end of each of said piston rods and terminating above the plane of the upper surface of said arms whereby pallets resting on said arms may be hooked by said dogs and pulled toward said framework upon actuation of said cylinders.

12. Apparatus for producing pre-cast building stone comprsing, in combination:
  a plurality of rigid elongated, channel-shaped pallets for supporting said stone during the curing thereof;
  means for molding a plurality of said stones on each of said pallets as said pallets are moved through said molding means, said molding means having an inlet end for receiving said pallets and an outlet end from which said pallets bearing molded, uncured stone are discharged;
  a first horizontal elongated trackway extending to the inlet end of said molding means for supporting and guiding a series of elongated pallets aligned longitudinally thereon as they are moved sequentially into said molding means;
  a second horizontal elongated trackway for supporting and guilding in longitudinal alignment therealong, elongated pallets discharged from said molding means, said second horizontal elongated trackway including a plurality of horizontally spaced pallet supporting members for supporting a horizontally extending pallet;
  a kiln for curing stone in place on said pallets, and positioned adjacent said horizontally spaced pallet supporting members, said kiln comprising
    a kiln housing having opposed ends openable for receiving pallets at one of the ends and discharging pallets at the other end;
    means for introducing steam into the lower portion of said kiln housing;
    a plurality of pallet supporting tiers in said kiln housing above the point of introduction of said steam, said tiers each comprising
      a plurality of horizontally spaced beams extending transversely across said housing, and
      a plurality of elongated, horizontally spaced tracks supported by said beams and extending longitudinally through said housing, said tracks projecting outwardly from one of the ends of said kiln housing for receiving pallets moved into said housing, and from the other end of said kiln housing for presenting pallets at the other end of said housing for removal therefrom;
  a pair of horizontally spaced, vertically extending track means adjacent said horizontally spaced pallet supporting members and on the opposite side thereof from said kiln;
  vertically movable, horizontal pallet carriage means extending between said horizontally spaced, vertically extending track means and guiding on said track means and moving upwardly and downwardly, said vertically movable, horizontal pallet carriage means comprising
    a rectangular framework having a plurality of spaced horizontal arms extending therefrom toward said kiln housing, said arms being oriented to pass between said spaced pallet supporting members, and between, and in horizontal alignment with, the tracks projecting outwardly from the ends of said kiln housing whereby pallets may be transferred from the spaced horizontal arms of said carriage means to the tiers in said kiln housing, said spaced horizontal arms being oriented to pass between said spaced, pallet supporting members when said carriage means is moved vertically;
  an elongated pusher bar carried by said pallet carriage means and extending across said horizontal arms in a direction parallel to said second trackway and normal to said horizontal arms;
  hydraulic cylinder means connected between said rectangular framework and said pusher bar for pushing said pusher bar toward said kiln housing along said horizontal arms and, alternately, withdrawing said pusher bar toward said framework and away from said kiln housing along said horizontal arms;
  an elongated, pallet supporting rack having one of its ends located adjacent said first trackway, and having its other end remotely located with respect to said first trackway, said pallet supporting rack further having an inclined portion adjacent its end adjacent said first trackway to allow pallets to gravitate down said inclined portion toward said first trackway;
  cam means adjacent said inclined portion of said pallet supporting rack;
  rocker arm means actuated by said cam means to permit one pallet at a time to slide down said inclined portion of said pallet supporting rack onto said first trackway;

conveyor means extending between the discharge end of said kiln housing and said other end of said pallet supporting rack;

a plurality of vertically extending horizontally spaced frames extending normal to said conveyor means on the opposite side of said conveyor means from said pallet supporting rack;

horizontal beams extending from said pallet supporting rack through said conveyor means to each of said vertically extending, horizontally spaced frames, said horizontal beams being positioned substantially level with the supporting surface of said conveyor means for slidingly receiving pallets pushed off of said conveyor means and onto said beams;

a second pusher bar extending across said horizontal beams in a direction normal thereto and parallel to said conveyor means;

hydraulic cylinder means connected between said vertical frames and said second pusher bar for pushing said bar across said conveyor means to slide said pellets off of said conveyor means and onto said pallet supporting rack;

a pair of horizontally spaced, vertically extending track means positioned adjacent the discharge end of said kiln housing;

vertically movable, horizontal pallet discharge carriage means extending between the spaced track means positioned adjacent the discharge end of said kiln housing and guiding and moving upwardly and downwardly thereon;

means for moving said discharge carriage means vertically; and means on said carriage means for horizontally pulling a pallet out of said kiln and onto said carriage means.

13. In a system for producing pre-cast building stones, the combination comprising:

a plurality of elongated pallets for supporting said stone during the curing thereof;

means for molding said stone on said pallets, said molding means having an inlet end for receiving said pallets and an outlet end from which pallets bearing molded, uncured stone are discharged;

a first horizontal elongated trackway extending to the end of said molding means for supporting and guiding a series of elongated pallets aligned longitudinally thereon as they are moved sequentially into said molding means;

a second horizontal elongated trackway for supporting and guiding in longitudinal alignment therealong, elongated pallets discharged from said molding means, said second horizontal elongated trackway having a plurality of horizontally spaced sections;

a kiln for curing stone in place on said pallets, said kiln comprising:

a generally rectangular housing;

means for introducing steam into the lower portion of said housing;

at least one pallet-supporting tier in said housing above the point of introduction of said steam and above said second horizontal trackway, said tier comprising a plurality of elongated, horizontally spaced beams extending transversely across said housing, and a plurality of elongated, horizontally spaced tracks supported by said beams extending longitudinally through said housing, said tracks projecting outwardly from the ends of said housing for receiving pallets and for presenting pallets for removal from said kiln;

means for lifting a pallet from said second horizontal trackway and moving said pallet horizontally in said kiln, said means for lifting a pallet including vertically movable pallet carriage means including horizontally extending arms each movable in a vertical plane between the horizontally spaced sections of said second trackway to facilitate lifting said elongated pallets from said second trackway;

an elongated pallet supporting rack having one of its ends located adjacent said first trackway, and having the other end remotely located with respect to said first trackway;

means for automatically transferring single pallets one after the other from said rack to said first trackway to facilitate longitudinal alignment of said pallets on said first trackway;

conveyor means extending between the discharge end of said kiln and said other end of the pallet supporting rack;

means for removing a pallet supporting cured stone from the tracks of said kiln and placing said pallet upon said conveyor means; and means for moving a pallet off said conveyor means and onto said rack.

14. In a system for producing pre-cast building stone, the combination comprising:

a plurality of elongated pallets for supporting said stone during the curing thereof;

means for molding said stone on said pallets, said molding means having an inlet end for receiving said pallets, and an outlet end from which pallets bearing molded, uncured stone are discharged;

a first horizontal elongated trackway extending to the inlet end of said molding means for supporting and guiding a series of elongated pallets aligned longitudinally thereon and moved sequentially into said molding means;

a second horizontal elongated trackway for supporting and guiding in longitudinal alignment therealong, elongated pallets discharged from said molding means, said second elongated trackway having a plurality of horizontally spaced sections;

a kiln for curing stone placed on said pallets, said kiln having an entrance end and a discharge end and having at least one pallet-receiving tier disposed above said sections of the second trackway;

means for lifting a pallet from said second horizontal trackway and moving said pallet horizontally into said kiln, said means including vertically movable pallet carriage means including horizontally extending arms movable in a vertical plane between said horizontally spaced sections to facilitate lifting said elongated pallets from said second trackway;

an elongated pallet supporting rack having one of its ends located adjacent said first trackway, and having its other end located remotely with respect to said first trackway;

means for automatically transferring single pallets one after the other from said rack to said first trackway to facilitate longitudinal alignment of said pallets on said first trackway;

conveyor means extending between the discharge end of said kiln and said other end of the pallet supporting rack;

a pair of horizontally spaced, vertically extending track means positioned adjacent the discharge end of said kiln and said conveyor means;

vertically movable, horizontal pallet carriage means extending between said pair of track means and guiding on said track means and moving upwardly and downwardly for transferring pallets from said kiln to said conveyor means;

means for moving said carriage means vertically;

means on said carriage means for horizontally pulling a pallet out of said kiln and onto said carriage means; and means for moving a pallet off said conveyor means and onto said pallet supporting rack.

15. In a system for producing a pre-cast building stone, the combination comprising:
- a plurality of elongated pallets for supporting said stone during the curing thereof;
- means for molding said stone on said pallets, said molding means having an inlet end for receiving said pallets and an outlet end from which pallets bearing molded, cured stone are discharged;
- a first horizontal elongated trackway extending to the inlet end of said molding means for supporting and guiding a series of elongated pallets aligned longitudinally thereon as they are moved sequentially into said molding means;
- a second horizontal elongated trackway for supporting and guiding in longitudinal alignment therealong, elongated pallets discharged from said molding means, said second horizontally extending trackway having a plurality of horizontally spaced sections;
- a kiln for curing stone in place on said pallets, said kiln having an entrance end and a discharge end, and having at least one pallet-receiving tier disposed above said second horizontal trackway;
- means for lifting a pallet from said second horizontal trackway and moving said pallet horizontally into said kiln, said pallet lifting means including vertically movable pallet carriage means having horizontally extending arms each movable in a vertical plane between said horizontally spaced sections to facilitate lifting said elongated pallets from said second trackway;
- an elongated pallet supporting rack having one of its ends located adjacent said first trackway, said one end having an inclined portion adjacent said first trackway to allow pallets to gravitate down said inclined portion toward said first trackway, and said elongated pallet supporting rack having its other end remotely located with respect to said first trackway;
- means for automatically transferring single pallets one after other from said pallet supporting rack to said first trackway to facilitate the horizontal alignment of said pallets on said first trackway, said transferring means comprising
- cam means adjacent the inclined portion of said pallet supporting rack; and
- rocker arm means actuated by said cam means to permit one pallet at a time to slide down said inclined portion onto said first trackway;
- conveyor means extending between the discharge end of said kiln and said other end of the pallet supporting rack;
- means for removing a pallet supporting cured stone from said kiln and placing said pallet upon said conveyor means; and
- means for moving a pallet off the conveyor means and onto said pallet supporting rack.

16. In a system for producing pre-cast building stone, the combination comprising:
- a plurality of elongated pallets for supporting said stone during the curing thereof;
- means for molding said stone on said pallets, said molding means having an inlet end for receiving said pallets, and an outlet end from which pallets bearing molded, uncured stone are discharged;
- a first horizontal elongated trackway extending to the inlet end of said molding means for supporting and guiding a series of elongated pallets aligned longitudinally thereon as they are moved sequentially into said molding means;
- a second horizontal elongated trackway for supporting and guiding in longitudinal alignment thereon, elongated pallets discharged from said molding means, said second horizontal elongated trackway having a plurality of horizontally spaced sections;
- a kiln for curing stone placed on said pellets, said kiln having an entrance end and a discharge end, and having at least one pallet-receiving tier disposed at a vertical level higher than said second horizontal trackway;
- means for lifting a pallet from said second horizontal trackway and moving it into said kiln, said pallet lifting means including vertically movable pallet carriage means having horizontally extending arms movable in a vertical plane between said horizontally spaced sections to facilitate lifting said elongated pallets from said second trackway;
- an elongated pallet supporting rack having one of its ends located adjacent said first trackway and having its other end remotely located with respect to said first trackway;
- means for automatically transferring single pallets one after the other from said pallet supporting rack to said first trackway to facilitate longitudinal alignment of said pallets on said first trackway;
- conveyor means extending between the discharge end of said kiln and said other end of the pallet supporting rack;
- means for removing a pallet supporting cured stone from the kiln and placing said pallet upon said conveyor means; and
- means for moving a pallet off the conveyor means and onto said rack, said means for moving the pallet off said conveyor means comprising:
- a plurality of vertically, horizontally spaced frames extending normal to said conveyor means on the opposite side of said conveyor means from said rack;
- horizontal beams extending from said pallet supporting rack through said conveyor means to said frames, said beams being positioned substantially level with the supporting surface of said conveyor means for receiving pallets pushed off of said conveyor means and onto said beams;
- a pusher bar extending across said beams in a direction normal thereto and parallel to said conveyor means; and
- hydraulic cylinder means connected to said vertical frames and said pusher bar for pushing said pusher bar across said conveyor means to slide said pallet off of said conveyor means and onto said pallet supporting rack.

17. In a system for producing pre-cast building stone of the type having elongated, channel-shaped pallets for supporting the stone, molding means for molding the stone on said pallets, and a kiln for curing the stone in place on said pallets, the improvement which comprises:
- a trackway for supporting and guiding a series of longitudinally aligned elongated pallets as they are moved sequentially into said molding means;
- an elongated pallet supporting rack adjacent said trackway for storing pallets in side by side horizontal juxtaposition to be fed to said trackway, said rack having a downwardly inclined end portion sloping down to said trackway;
- cam means adjacent the inclined portion of said rack;
- a handle connected to said cam means for pivoting said cam means;
- rocker arm means actuated by said cam means to permit one pallet at a time to slide down said inclined end portion, said rocker arm means including an elongated shaft for slidingly receiving a pallet at the bottom of said downwardly inclined end portion when said rocker arm means is actuated, and a toe projecting upwardly from one end of said elongated shaft for arresting the sliding movement of said pallet on said rack; and
- means for automatically transferring pallets from said kiln to said pallet supporting rack.

18. In a system for producing pre-cast building stone of the type having elongated, channel-shaped pallets for supporting the stone, molding means for molding the stone on said pallets, and a kiln for curing the stone in place on said pallets, the improvement which comprises:
- a trackway for supporting and guiding a series of longitudinally aligned elongated pallets as they are moved sequentially into said molding means;

an elongated pallet supporting rack adjacent said trackway for storing pallets to be fed to said trackway;

a conveyor for moving pallets from said kiln past one end of said pallet supporting rack;

a plurality of vertical, horizontally extending frames extending normal to said conveyor means on the opposite side of said conveyor means from said rack;

horizontal beams extending from said rack through said conveyor means to said frames, said horizontal beams being positioned substantially level with the supporting surface of said conveyor means for slidingly receiving the pallets pushed off of said conveyor means and onto said beams;

a pusher bar extending across said beams, in a direction normal thereto and parallel to said conveyor means;

hydraulic cylinder means connected between said vertical frame and said pusher bar for pushing said bar across said conveyor means to slide said pallet off of said conveyor means and onto said pallet supporting rack; and means for automatically transferring pallets from said pallet supporting rack to said trackway in consecutive sequence to align said elongated channel-shaped pallets on said trackway.

19. Apparatus for loading elongated pallets into a kiln used for curing pre-cast stone in place on the pallets comprising:

a pair of vertical, horizontally spaced track means;

gear teeth on each of said vertical, horizontally spaced track means;

vertically movable, horizontal pallet carriage means extending between said spaced track means and guiding on said track means in moving upwardly and downwardly;

interconnected gear means secured to each end of said horizontal carriage means and meshing with said gear teeth on said vertical track means during vertical movement of said carriage means to maintain said carriage means horizontally level;

means for moving said carriage means vertically; and means on said carriage means for horizontally pushing a pallet off said carriage means and into said kiln.

20. Apparatus for moving a pallet into a kiln used for curing pre-cast stone in place on said pallet comprising:

a pair of vertically, horizontally spaced track means, each of said track means comprising:

a rectangular frame having two vertical side members, a top member and a bottom member;

a horizontal rectangular framework mounted between each of said vertical, horizontally spaced track means;

rollers on each end of said horizontal framework positioned to track and guide on said vertitcal side members as said rectangular framework is moved vertically;

a plurality of spaced, horizontal arms extending from one side of said framework and parallel to the rectangular frames on said track means for supporting said pallets as they are lifted upwardly for placement in said kiln;

means for moving said horizontal rectangular framework vertically on said side members;

an elongated pusher bar extending across said horizontal arms in a direction normal to said arms; and hydraulic cylinder means connected between said rectangular framework and said pusher bar for pushing said bar toward said framework and away from said kiln, and, alternately, toward said kiln along said arms.

21. Apparatus for producing pre-cast building stone comprising, in combination:

a plurality of elongated pallets for supporting said stone during the curing thereof;

means for molding stones on each of said pallets as said pallets are moved through said molding means, said molding means having an inlet end for receiving said pallets and an outlet end from which said pallets bearing molded, uncured stone are discharged;

a first horizontal elongated trackway extending to the inlet end of said molding means for supporting and guiding a series of elongated pallets aligned longitudinally thereon as they are moved sequentially into said molding means;

a second horizontal elongated trackway for supporting and guiding in longitudinal alignment therealong, elongated pallets discharged from said molding means, said second elongated trackway including a plurality of horizontally spaced pallet supporting members for supporting a horizontal extending pallet;

a kiln for curing stone in place of said pallets and positioned adjacent said horizontally spaced pallet supporting members, said kiln including a housing and having a pallet supporting tier located therein spaced vertically from said horizontally spaced pallet supporting members of said second horizontally elongated trackway;

a pair of horizontally spaced, generally vertically extending track means adjacent said horizontally spaced pallet supporting members and on the opposite side thereof from said kiln;

vertically movable, horizontal pallet carriage means extending between said horizontally spaced, generally vertically extending track means and guiding on said track means in moving upwardly and downwardly, said vertically movable, horizontal pallet carriage means comprising:

a framework having a plurality of spaced, generally horizontal arms extending therefrom toward said kiln, said arms being oriented to pass between said spaced pallet supporting members of said second trackway and, in general horizontal alignment with the tier in said kiln whereby pallets may be transferred from the spaced horizontal arms of said carriage means to the tier in said kiln;

an elongated pusher bar carried by said pallet carriage means and extending across said horizontal arms;

means connected between said rectangular framework and said pusher bar for pushing said pusher bar toward said kiln housing along said horizontal arms and, alternately, withdrawing said pusher bar toward said framework and away from said kiln housing along said horizontal arms;

an elongated, pallet supporting rack having one of its ends located adjacent said first trackway, and having its other end remotely located with respect to said first trackway, said pallet supporting rack further having an inclined portion adjacent said first trackway to allow pallets to gravitate down said inclined portion toward said first trackway;

cam means adjacent said inclined portion of said pallet supporting rack;

rocker arms means actuated by said cam means to permit one pallet at a time to slide down said inclined portion of said pallet supporting rack onto said first trackway;

conveyor means extending between the discharge end of said kiln housing and said other end of said pallet supporting rack;

a plurality of generally vertically extending, horizontally spaced frames extending normal to said conveyor means on the opposite side of said conveyor means from said pallet supporting rack;

horizontal beams extending from said pallet supporting rack through said conveyor means to each of said vertically extending, horizontally spaced frames, said horizontal beams being positioned substantially level with the supporting surface of said conveyor means for slidingly receiving pallets pushed off of said conveyor means and onto said beams;

a second pusher bar extending across said horizontal beams in a direction normal thereto and parallel to said conveyor means;

means connected between said vertical frames and said second pusher bar for pushing said second pusher bar across said conveyor means to slide said pallets off of said conveyor means and onto said pallet supporting rack;

a pair of horizontally spaced, generally vertically extending track means positioned adjacent said kiln housing at the discharge end thereof;

vertically movable, horizontal pallet discharge carriage means extending between the spaced track means positioned adjacent the discharge end of said kiln housing and guiding thereon in moving upwardly and downwardly;

means for moving said discharge carriage means vertically; and means on said carriage means for horizontally pulling a pallet out of said kiln housing and onto said pallet discharge carriage means.

References Cited by the Examiner
UNITED STATES PATENTS

| | | | |
|---|---|---|---|
| 683,337 | 9/1901 | Schulthess | 264—345 |
| 1,818,805 | 8/1931 | Jacquart | 25—2 |
| 2,218,935 | 10/1940 | Ingersoll | 264—57 |
| 2,496,016 | 1/1950 | Nelson | 25—42 |
| 2,535,961 | 12/1950 | Schutt | 25—1 |
| 2,718,972 | 9/1955 | Temple | 214—16.4 |
| 2,869,739 | 1/1959 | Davis | 25—2 |

ROBERT F. WHITE, *Primary Examiner.*

ALEXANDER H. BRODMERKEL, *Examiner.*